US007853191B2

(12) United States Patent
Jinza et al.

(10) Patent No.: US 7,853,191 B2
(45) Date of Patent: Dec. 14, 2010

(54) IMAGE READING APPARATUS

(75) Inventors: Osamu Jinza, Fuefuki (JP); Seiji Nishizawa, Chuo (JP); Kazuhisa Motizuki, Minamikoma-gun (JP); Tetsuya Noda, Minami Alps (JP); Masataka Hamada, Fuefuki (JP)

(73) Assignee: Nisca Corporation, Minamikoma-gun (JP)

(*) Notice: Subject to any disclaimer, the term of this patent is extended or adjusted under 35 U.S.C. 154(b) by 757 days.

(21) Appl. No.: 11/746,075

(22) Filed: May 9, 2007

(65) Prior Publication Data

US 2007/0264062 A1 Nov. 15, 2007

(30) Foreign Application Priority Data

May 9, 2006 (JP) ............................. 2006-130605

(51) Int. Cl.
*G03G 15/00* (2006.01)
*H04N 1/00* (2006.01)
*H04N 1/04* (2006.01)

(52) U.S. Cl. ...................................................... 399/367

(58) Field of Classification Search ................. 399/367; 358/496, 498

See application file for complete search history.

(56) References Cited

U.S. PATENT DOCUMENTS 6,557,843 B2 * 5/2003 Kawamoto et al. ......... 271/3.01
6,836,631 B2 * 12/2004 Mogi ......................... 399/118
2003/0081269 A1 * 5/2003 Aoyama et al. ............. 358/474

FOREIGN PATENT DOCUMENTS

JP 2001-042578 A 2/2001
JP 2001-313757 A 11/2001
JP 2005104661 A * 4/2005
JP 2005-304064 A 10/2005

* cited by examiner

*Primary Examiner*—Judy Nguyen
*Assistant Examiner*—Jennifer Simmons
(74) *Attorney, Agent, or Firm*—James Judge

(57) ABSTRACT

An image reading apparatus equipped with an image reading apparatus unit (B) provided a platen (33) and reading means (31) that reads an original, a document feeder (A) provided conveyance paths (P1), (P2), and (P3) leading from a sheet supply tray (1) to a discharge tray (34) via the platen (33) on a top surface of the image reading apparatus unit (B), a hinge device (12) that openably connects the document feeder (A) to a top surface of the image reading apparatus unit (B), wherein an image reading unit (50) is equipped in the document feeder (A), and the image reading unit (50) is integrally connected to a support member fastened to the hinge device (12). This configuration prevents mispositioning or misalignment of a reading line of the image reading unit (50) caused by repeated opening and closing of the document feeder (A).

8 Claims, 6 Drawing Sheets

IMAGE READING APPARATUS

BACKGROUND OF THE INVENTION

1. Technical Field

The present invention, involving image reading (scanning) apparatuses for reading image data in photocopiers, facsimile machines, computer networks, etc., relates to devices that scan both sides of an original-image document in the course of conveying the document from a sheet supply tray to a discharge tray.

2. Description of the Related Art

Generally, this kind of image reading apparatus is widely used as a device that scans original images in the course of conveying a document original sheet from a sheet supply tray to a discharge tray. Duplex scanning apparatuses that read images on one side of an original sheet in the course of the sheet's conveyance, then read images on the reverse side of the original are sheet are known. For the scanning means in such devices, photoelectric conversion elements are used, while line-sensors in reduction optics and contact-type line sensors in 1× optics are also known.

For example, Japanese Unexamined Pat. App. Pub. No. 2001-42578 proposes an apparatus configuration whereby an original sheet is conveyed from a sheet supply tray at an upper unit to a first platen at a lower unit, the upper and lower units being vertically disposed, and proposes providing a second platen in a path leading the original sheet to a discharge tray after images have been read at the first platen. A reduction-optics sensor is disposed at the first platen, and a 1×-optics sensor is disposed at the second platen. An original platen that is different from the first platen is provided in the lower unit to accommodate books or other types of thick or bulky originals. Ordinarily, these kinds of upper and lower units are configured to be able to open using a hinge unit. Specifically, the upper unit opens to allow an original to be placed on the platen.

Conventionally, if first and second image reading sensors are disposed in a path that guides the original sheet from the sheet supply tray to the discharge tray, a fixing means, such as screws, is used to mount the 1×-optics contact sensor to a sheet conveyance guide. The focal depth is shallower for contact sensors than it is for reduction-optics sensors, so mispositioning of the contact sensor causes improper focusing of the original and blurring of read images. Conventionally, however, when such sensors are fastened by screws to the guide plate on which original are conveyed, they can come out of their proper positioning by the repeated opening and closing of the apparatus. Furthermore, if it is difficult to remove dust or dirt adhering to image reading surface (platen) of the sensor, the sensor unit must be removed from the apparatus and cleaned. Conventionally, there was the possibility of scratching the reading surface when removing the sensor unit. Therefore, considerable skill and close attentiveness have been required in detaching the sensor unit.

Thus, the present invention provides an image reading apparatus that allows the easy mounting and removal of a sensor unit in an original sheet conveyance path with little or no mispositioning of the sensor unit at the upper unit side when the upper unit is repeatedly opened and closed over the bottom unit with the sensor unit mounted.

BRIEF SUMMARY OF THE INVENTION

The present invention provides an image reading apparatus equipped with a platen for placing an original for reading images thereon; and reading means that reads one side of an original placed on the platen. The image reading apparatus is composed of a document feeder equipped with a sheet supply tray that stacks originals; a discharge tray that stores read originals; a conveyance path leading from the sheet supply tray to the discharge tray via the platen; and a hinge device that openably connects the document feeder to the image reading apparatus. Also provided are a reading unit disposed in the document feeder that reads another side of the original, and support means that supports the reading unit, the support means being integrally connected to the hinge device.

DETAILED DESCRIPTION OF THE INVENTION

Figure 1:
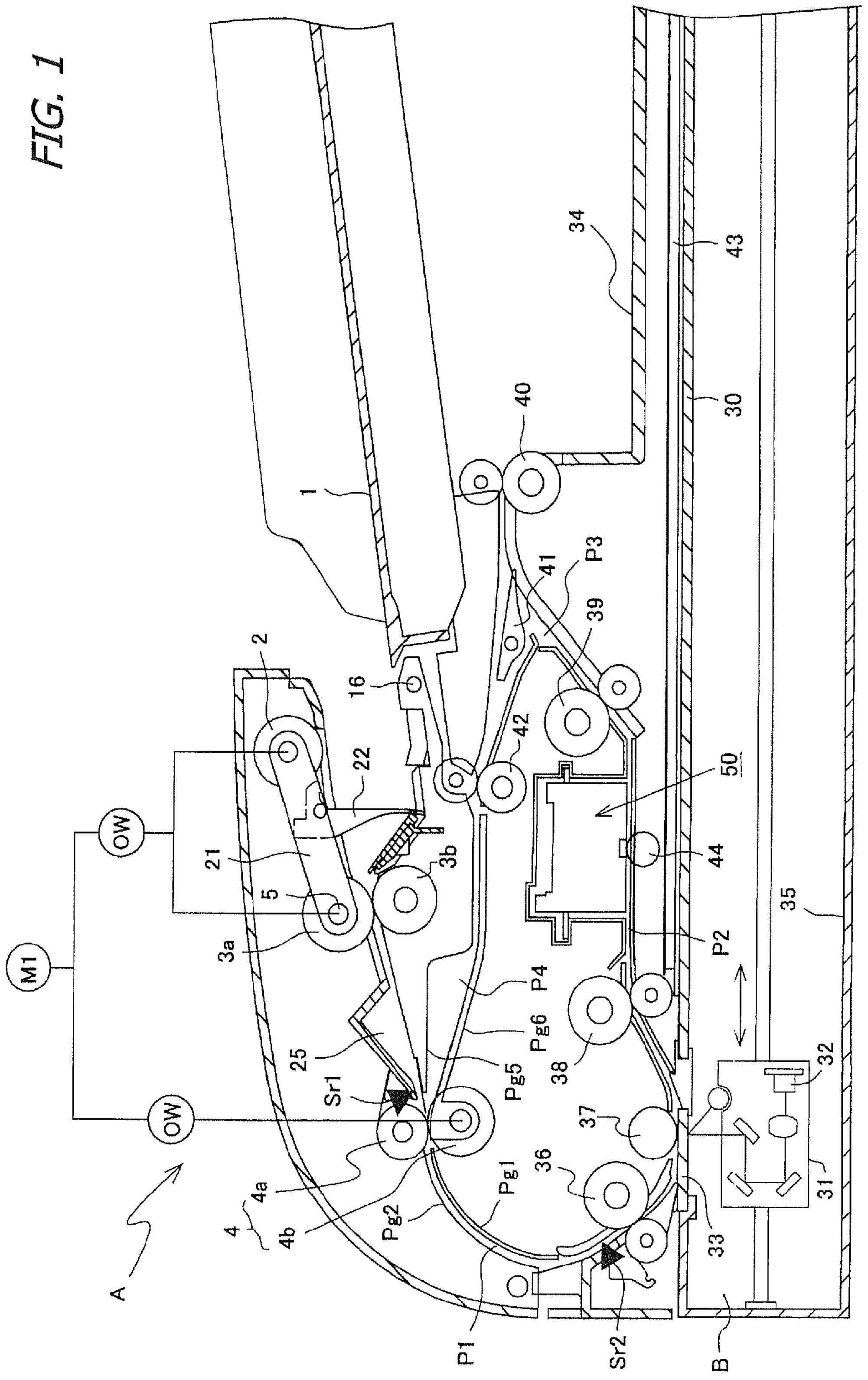
FIG. 1 is a sectional view of an image reading apparatus according to the present invention.

Preferred embodiments of the present invention will now be explained with reference to the drawings provided. FIG. 1 is a sectional view of the overall image reading apparatus according to the present invention.

The invention shown in FIG. 1 is composed of a lower unit B equipped with a first platen 33, and of an upper unit A installed to the lower unit B. An original platen 30 adjacent to first platen 33, and a carriage 31 that is a first image reading means that reciprocates along both platens 30 and 33 are equipped. The carriage 31 is supported on a guide rail to move along the original platen 30 to scan the original sheet set on the original platen 30; the carriage is also fastened to a tract member, such as a transmission belt, connected to a drive motor (not shown).

A photoelectric conversion means 32, such as a CCD, is equipped on the carriage 31; an optical means, such as a focusing lens that forms original images, and mirrors, and a light source lamp are equipped on the photoelectric conversion means 32. Therefore, to read the image data, light from the light source on the carriage 31 irradiated onto the first platen 33, and the original on the original platen 30, is reflected by mirrors, formed into an image on the photoelectric conversion means 32 by the focusing lens, and then converted to electrical signals. The focusing lens is composed of an ordinary reducing imaging lens. Note that it is also acceptable not to install the photoelectric conversion means 32 and focusing lens on the carriage 31, as described above, but at a bottom of the casing 35. Also, it is acceptable to install them in a separate, second carriage different to the carriage mounted with the light source.

The upper unit A equipped with the sheet supply tray 1 and discharge tray 34 is installed above the original platen 33 and first platen 30 of the bottom unit B. A substantially U-shaped conveyance path that guides an original sheet from the sheet supply tray 1 to the discharge tray 34 via the first platen 33 is formed in the upper unit A as described below. The conveyance path is composed of a paper feed path P1 that guides an original sheet from the sheet supply tray 1 to the first platen 33; a straight conveyance path P2 that guides the original sheet from the first platen 33 to the discharge tray 34; and a cycling path P4 that recycles the conveyed original sheet, its leading edge fed into the discharge tray 34, to switch the original back to guide it again through the paper feed path P1. Essentially, this process enables the system to read a second side of the original. The conveyance path P2 is formed to be substantially straight; a second image reading means (hereinafter referred to as a contact sensor unit) 50 is disposed equipped with a second platen 51 for reading a backside (the second side) of a switched back original sheet.

A pickup roller 2 is disposed near the sheet supply tray 1 supported by a rocking arm 21 to move between an idle position above the tray, and an actuating position where the pickup roller 2 engages an uppermost sheet on the tray. A gate stopper 22, is disposed to be moved by an actuating solenoid (not shown) between an aligning position (see the state in FIG. 1) to engage and align the leading edge of the sheet, and a retracted position retracted away from the tray. The rocking arm 21 is supported by a rotating shaft 5 connected to a paper feed unit drive motor M1, interposed by a spring clutch. The spring clutch loosens when the rotating shaft 5 is rotated in the paper feed direction thereby moving the rocking arm 21 from the idle position to the actuating position, and becomes taught when the rotating shaft 5 is rotated in the reverse paper feed direction thereby rockingly rotate the rocking arm 21 in the counterclockwise direction of FIG. 1. It is held at the idle position shown in FIG. 1 by a stopper (not shown). Furthermore, rotational force of the rotating shaft 5 in the paper feed direction is transmitted to the pickup roller 2 by a transmission belt, or the like.

A paper feed roller means 3*a* is supported on the rotating shaft 5, interposed by a one-way clutch. Separating means, such as a separating roller 3*b* or the like, is pressed against the paper feed roller means 3*a* to separate original sheets picked up or drawn out of the sheet supply tray 1 by the pickup roller 2 into a single sheet to allow the original sheet to be conveyed further downstream by the paper feed roller means 3*a*. A paper feed guide 25 that forms the paper feed path P1 is formed at a downstream side of the paper feed roller means 3*a* by an upper paper guide Pg1 and lower paper guide Pg2. A registration roller means 4 composed of a drive roller 4*a* and a follower roller 4*b* is disposed in the paper feed path P1; a registration sensor Sr1 is disposed at an upstream side thereof. A read roller 36 is disposed upstream side near the first platen 33. Therefore, the leading edge of the original sheet from the paper feed means 3*a* is aligned by the registration roller means 4, and the original sheet is further conveyed to the downstream read roller 36. The registration roller means 4 is connected to the paper feed unit drive motor M1 that rotates in a direct away from the paper feed roller means 3*a*. The rotating shaft 5 is rotatingly driven by the forward drive of the motor M1; the registration roller means 4 is rotatingly driven by the reverse drive of that motor.

The read roller 36 supplies the original sheet to the first platen 33 at a constant speed at a signal from the sheet sensor Sr2 disposed near an upstream side of that roller. The speed of the read roller 36 is specified by the control unit of the lower unit B for type of original (color or B/W), and the variable magnification. A backup roller 37 is disposed at the reading position of the first platen 33, and a first conveyance roller 38 is disposed downstream. These convey the original sheet at the same speed as the read roller 36. The read roller 36, backup roller 37, and first conveyance roller 38 are connected to a conveyance unit drive motor M2 along with the discharge roller 40. The second platen 51 is disposed in the straight conveyance path P2 leading from the first platen 33 to the discharge tray 34. The first conveyance roller 38 and second conveyance roller 39 are each composed of a pair of opposing pressing rollers at predetermined distances in the conveyance path P2. The straight conveyance path P2 is composed of an upper paper guide Pg3 and a lower paper guide Pg4.

A discharge path P3 is provided downstream of the straight conveyance path P2; a path switching flapper 41 near an upstream side of the discharge outlet guides an original sheet either from the discharge path P3 to the discharge tray 34 or to the cycling path P4 using an actuating solenoid (not shown). A feed roller 42 and an upper paper guide Pg5 and a lower paper guide Pg6 that compose a path are provided in the cycling path P4. The feed roller 42 is connected to the conveyance unit drive motor M2. Therefore, an original sheet conveyed from the first platen 33 is guided to the second platen 51 via the straight conveyance path P2, and then from the discharge path P3 to the discharge tray 34 for storage. While the original sheet is nipped by the discharge roller 40, the conveyance unit drive motor M2 drives in reverse thereby causing the original sheet to be guided by the path switching flapper 41 into the cycling path P4. The feed roller 42 conveys the original sheet to the registration roller means 4 in the paper feed path P1.

Note that the cycling path P4 is disposed in the apparatus shown in the drawings to guide an original to the paper feed path P1 without being read at the second platen 51, so that its backside (the second side) can be read at the first platen 33. Thus, it is possible to avoid reading images using the contact sensor unit (second image reading means) which has comparatively poor reading accuracy when reading color images or fine images. An original cover 43 of the platen 30 is mounted to the upper unit.

Figure 2:
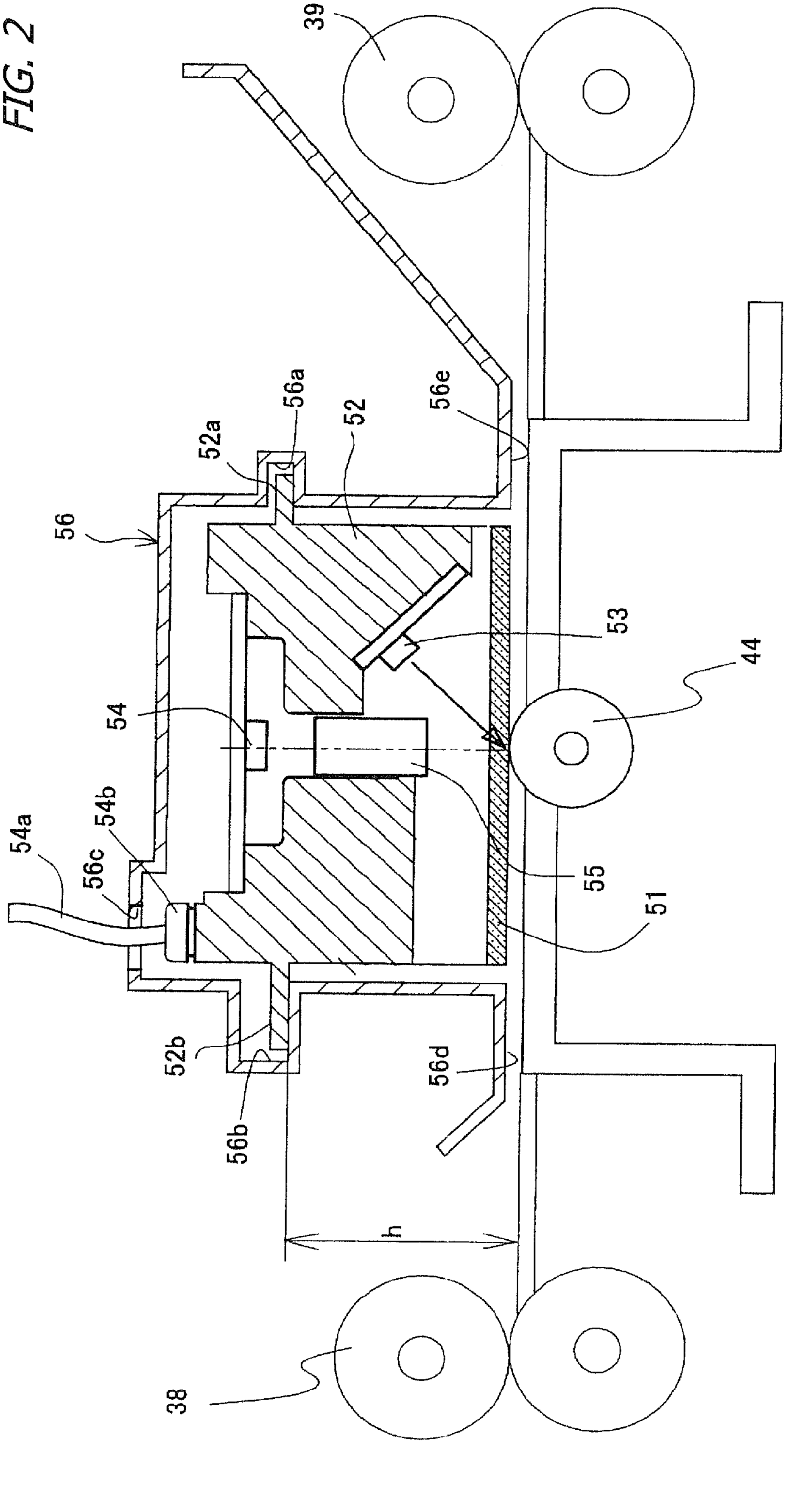
FIG. 2 is an expanded sectional view of the area around a sensor unit in the image reading apparatus.

FIG. 2 is an expanded sectional view of the area around the sensor unit in the image reading apparatus. The contact sensor unit (hereinafter referred to as the sensor unit) 50 has an LED array 53, a Selfoc lens array 55, and sensor array 54 built-in to a plastic frame 52, and is composed as a unit to cover the second platen 51, as shown in the sectional view of FIG. 2. Normally, a Selfoc lens array 55 is composed of an 1× imaging lens whose focal depth is shallow compared to a reducing imaging lens. Therefore, a structure that opposingly disposes a backup roller 44 that touches the original sheet against the second platen 51 is adopted. This structure is described below.

The sensor unit 50 is fit into holder member 56s formed in the apparatus frame. The holder members 56 are composed of substantially U-shaped channeled steel material perpendicular to the direction of original sheet conveyance in the straight conveyance path P2. For that reason, recesses 56*a*, 56*b* that compose guide rails are formed in the opposing side walls of the holder member 56. Projections 52*a*, 52*b* that conform to the pair of projections 56*a*, 56*b* are formed on the sensor unit 50.

The projections 52*a*, 52*b* of the sensor unit 50 mate with the recesses 56*a*, 56*b* by being inserted from one end (the front side of FIG. 2) to the other (toward the back side of the same drawing) of the holder member. This sets a height position h with the lower paper guide Pg4 that composes the straight conveyance path P2. An output cable 54*a* from the sensor array 54 of the sensor unit 50 is connected by a connector that has a detachable socket 54*b*, and is pulled out from an opening 56*c* formed in the holder member 56.

A lower paper guide Pg4 that forms a predetermined gap with the platen (second platen) 51 of the sensor unit, is disposed in the straight conveyance path P2, and the backup roller 44 that opposes the reading unit of the platen (second platen) 51 is fixed to the paper guide Pg4. The backup roller 44 is formed by a free roller that follows the movement of the original sheet. The upper paper guide Pg2 of the straight conveyance path P2 is formed of the platen (second platen) 51 of the sensor unit 50 and guides (guide members) 56*d*, 56*e* formed into the holder member 56.

In addition to bending and forming channel steel, the guides 56*d*, 56*e* can also be integrally formed by mounting different members than the channel members. Because the guides 56*d*, 56*e* (guide members) are integrally formed in the holder member 56 to guide the original sheet to the platen (the second platen) 51, it is possible to maintain a fixed positional relationship between the platen (second platen) 51 of the sensor unit 50 and the guides (guide members) 56*d*, 56*e*. Essentially, no level difference is generated between the two.

Figure 3:
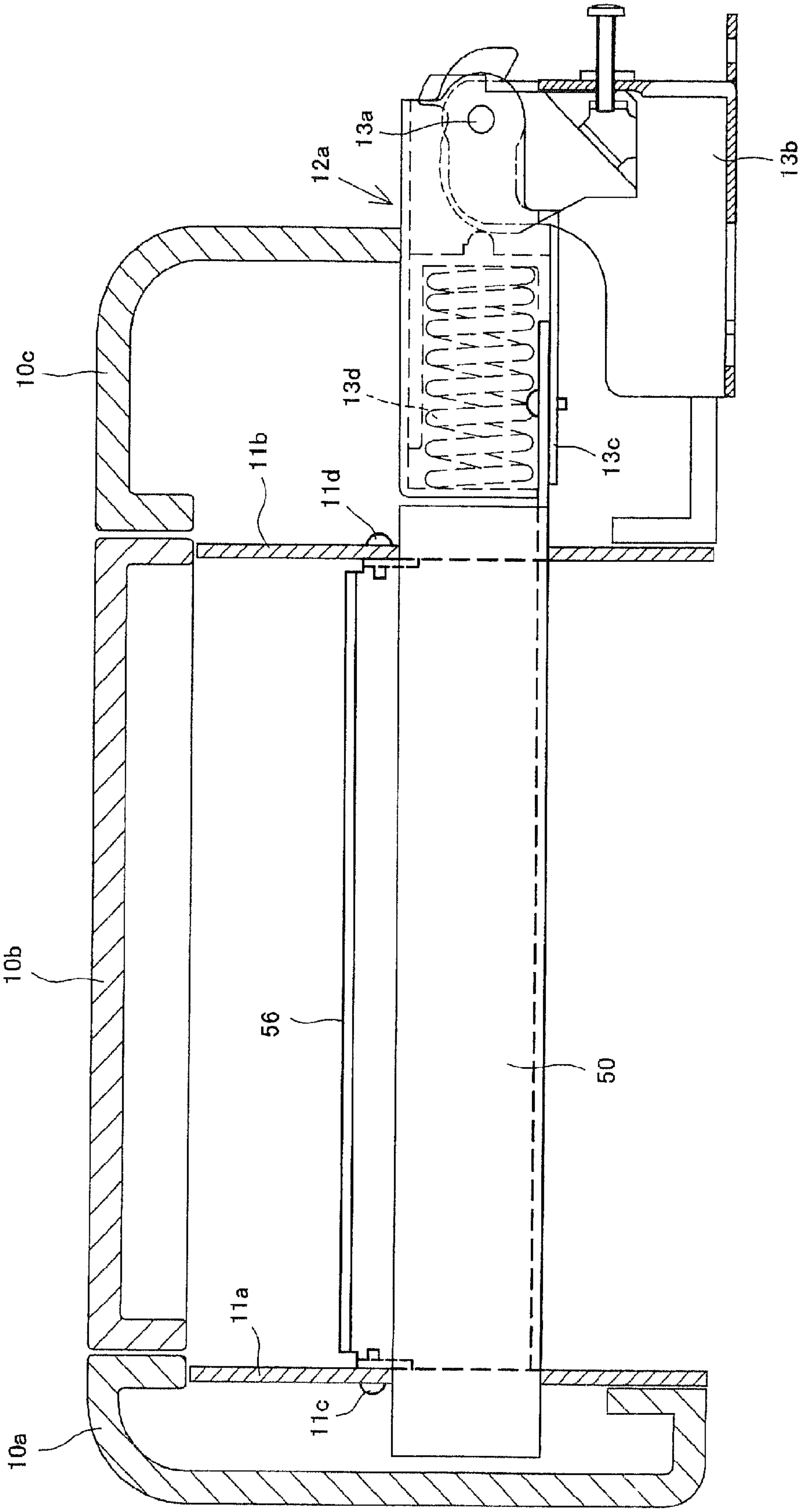
FIG. 3 is a view of the mounted sensor unit.

FIG. 3 is a view of the mounted sensor unit. The holder member 56 is mounted between the side plate frames 11*a*, 11*b*, as shown in FIG. 3. The apparatus shown in the drawing is composed of monocoque structure that mounts the components to the synthetic outer case 10. Side plate frames 11*a*, 11*b* (opposing each other at the front and back sides of FIG. 1) are disposed on the outer case 10 to ensure mechanical strength. The paper feed drive motor M1, described below, and a transmission mechanism are mounted to the side plate frames 11*a*, 11*b*. The holder member 56 is composed as a stay member (a reinforcing member that connects both side plates) on the mutually opposing side plate frames 11*a*, 11*b*.

The holder member 56 is fastened to the front and back side plate frames 11*a*, 11*b* by fixing screw 11*c* and boss 11*d*, for example, and the outer case 10 is fastened to the side plate frames 11*a*, 11*b* by screws. The sensor unit 50 is inserted from a front side of the apparatus and supported (the left side of FIG. 3) on the holder member 56. One side of a hinge unit 12*a* is mounted to a rear side (the right side of FIG. 3) of the holder member 56; the other side of the hinge unit 12*a* is mounted to the lower unit B. As shown in FIG. 3, the hinge unit 12*a* is composed of a first mounting member 13*b* and a second mounting member 13*c* mutually connected by a hinge shaft 13*a*, and a compression spring 13*d* disposed between both mounting members. The first mounting member 13*b* is mounted to the top surface wall of the bottom unit B. A second mounting member 13*c* is mounted to the holder member 56.

Therefore, the holder member 56 is openably mounted to the bottom unit B by the hinge unit 12*a* with the side plate frames 11*a*, 11*b* and outer case 10 supported. Note that an auxiliary hinge unit 12*b* is mounted to the side plate frame rear side 11*b*, as shown in the overall perspective view of FIG. 5. In the same way as hinge unit 12*a*, the auxiliary hinge unit 12*b* is a comparatively simple structure without a compression spring; it rotatably connects the upper unit A and lower unit B by a hinge shaft. In this way, the hinge unit 12*a* supports a great deal of the apparatus weight, and the auxiliary hinge unit 12*b* simply rotatably connects both the upper and lower units A and B.

Also, the drive motor M1 that rotating drives the pickup roller 2, paper feed roller means 3*a* and registration roller means 4, and the transmission mechanism are provided at the apparatus rear side plate frame 11*b*.

Figure 4:
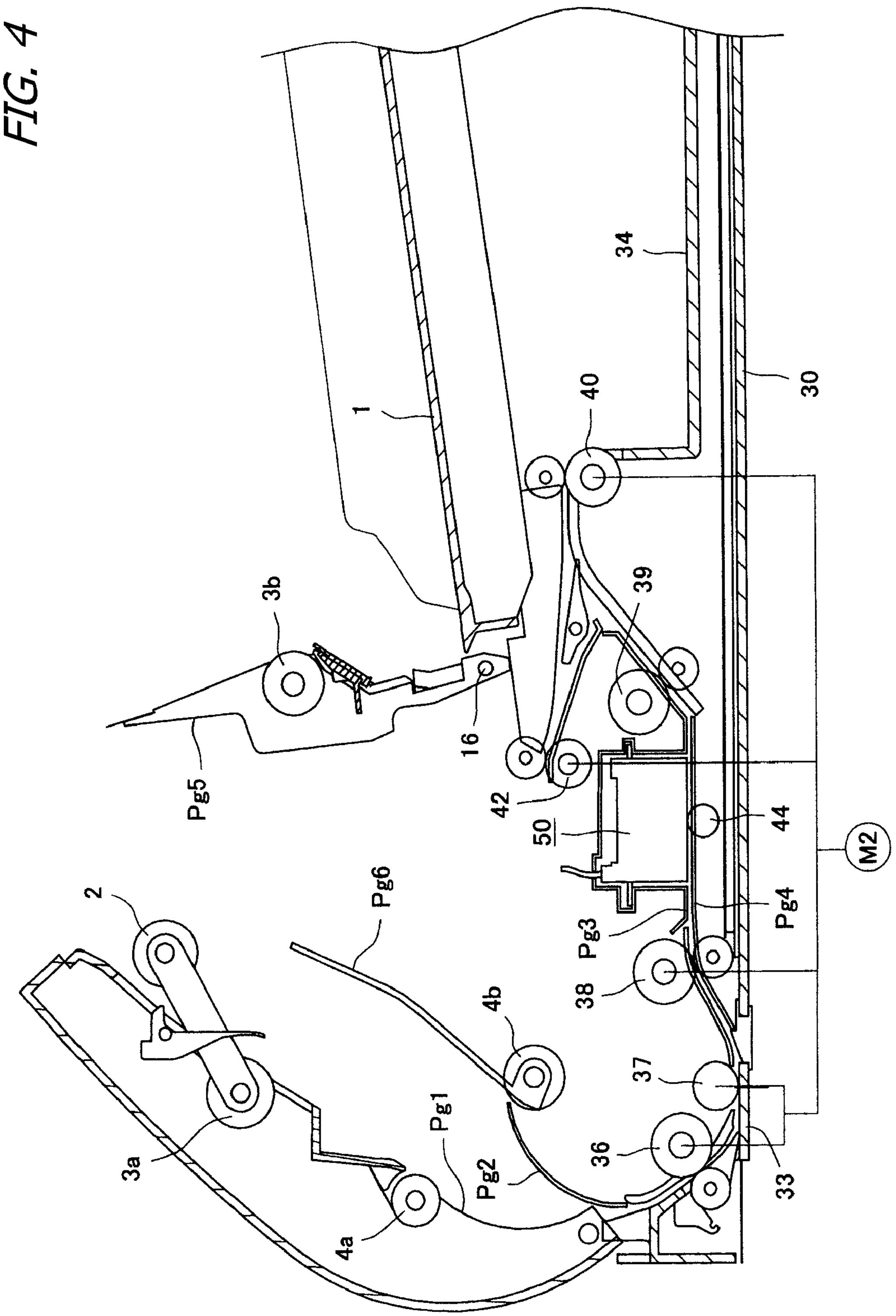
FIG. 4 is a sectional view to explain accessing the sensor unit.
Figure 5:
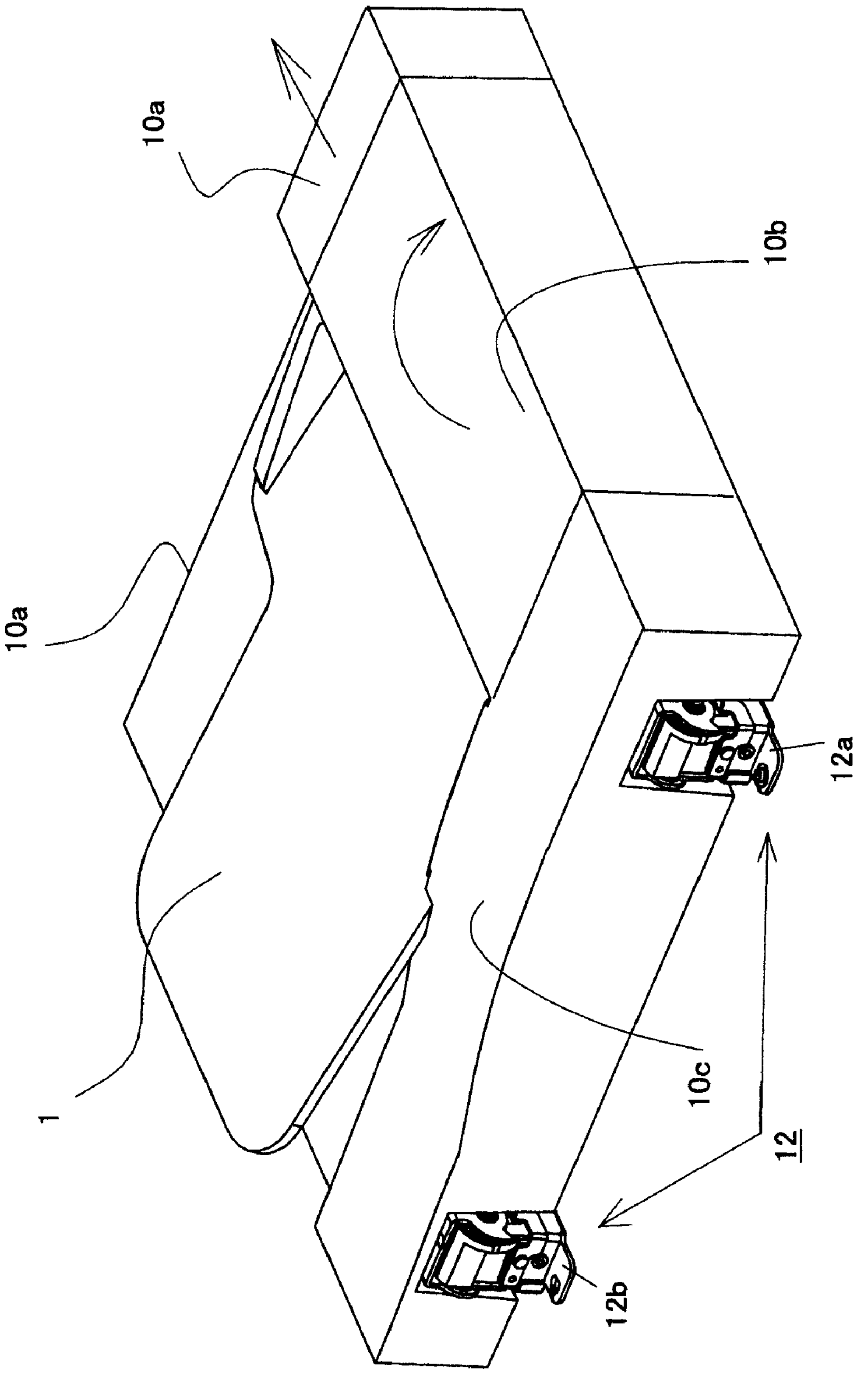
FIG. 5 is an overall perspective view of an arrangement of a hinge device of a document feeder.

Detaching the sensor unit 50 will now be explained with reference to FIG. 4. FIG. 4 is a sectional view to explain detaching the sensor unit. As shown in FIG. 5, the outer case 10 is composed to separate the front cover 10*a*, the rear cover 10*b* and the paper feed cover 10*c*. The front cover 10*a* is detachable in the direction of the arrow in that drawing; the paper feed cover 10*c* rotates in the direction of the arrow in that drawing. FIG. 4 shows the state when the front cover 10*a* is removed and the paper feed cover 10*c* is rotated open. In FIG. 4, the upper paper guide Pg1 that composes the paper feed path P1 is integrally configured to the front cover 10*a* to open the paper feed path P1. The lower paper guide Pg6 that composes the cycling path P4 opens to the state shown in the drawing around the rotating shaft of the registration roller means 4. The upper paper guide Pg5 is also rotatable to the state shown in the drawing, around the shaft 16.

Each guide member opens, as shown in FIG. 4, so the socket 54*b* and the fixing screw of the sensor unit 50 can be removed if required. The sensor unit 50 can then be pulled to the front side of the apparatus shown in FIG. 4. By pulling the sensor unit 50 out along the recesses 56*a*, 56*b* formed to a rail shape in the holder member 56, it is possible to remove it from the apparatus. When removed, there is no danger of hitting and damaging the platen (second platen) 51. This unit can also be remounted to the apparatus along the rail-shaped recesses 56*a*, 56*b* without damaging the platen, while maintaining the positional relationship with the back roller 44.

The invention provides the lower unit equipped with the first platen, and the upper unit equipped with the second platen. Also, a sectional, substantially U-shaped holder member is disposed in a perpendicular direction to original sheet conveyance on the upper unit. Because the second image reading means (sensor unit) is formed with projections on one member, and recesses on the other, the sensor unit is matingly mounted into the holder member. Therefore, it is easy to install or remove the sensor unit without damaging the reading surface when detaching the sensor unit.

Also, the hinge means is fastened to the holder member, so the upper unit is openably connected to the bottom unit. Therefore, even if the apparatus frame becomes distorted from opening and closing, the position of the sensor unit mounted to the holder member will constantly be accurate and provide stable image readings.

Furthermore, a sheet supply tray and discharge tray are both disposed above the bottom unit. A substantially U-shaped conveyance path is disposed leading from the sheet supply tray to the discharge tray leading via the first platen. By disposing a holder member that fastens a hinge means in a path leading from the first platen of the conveyance path to the discharge tray, the weight of drive mechanisms such as drive motors that kick out originals from a tray stacked with original sheets and a sheet supply tray are mutually balanced centering on the holder member and opened by a hinge, so the apparatus is more smaller and more compact.

Figure 6:
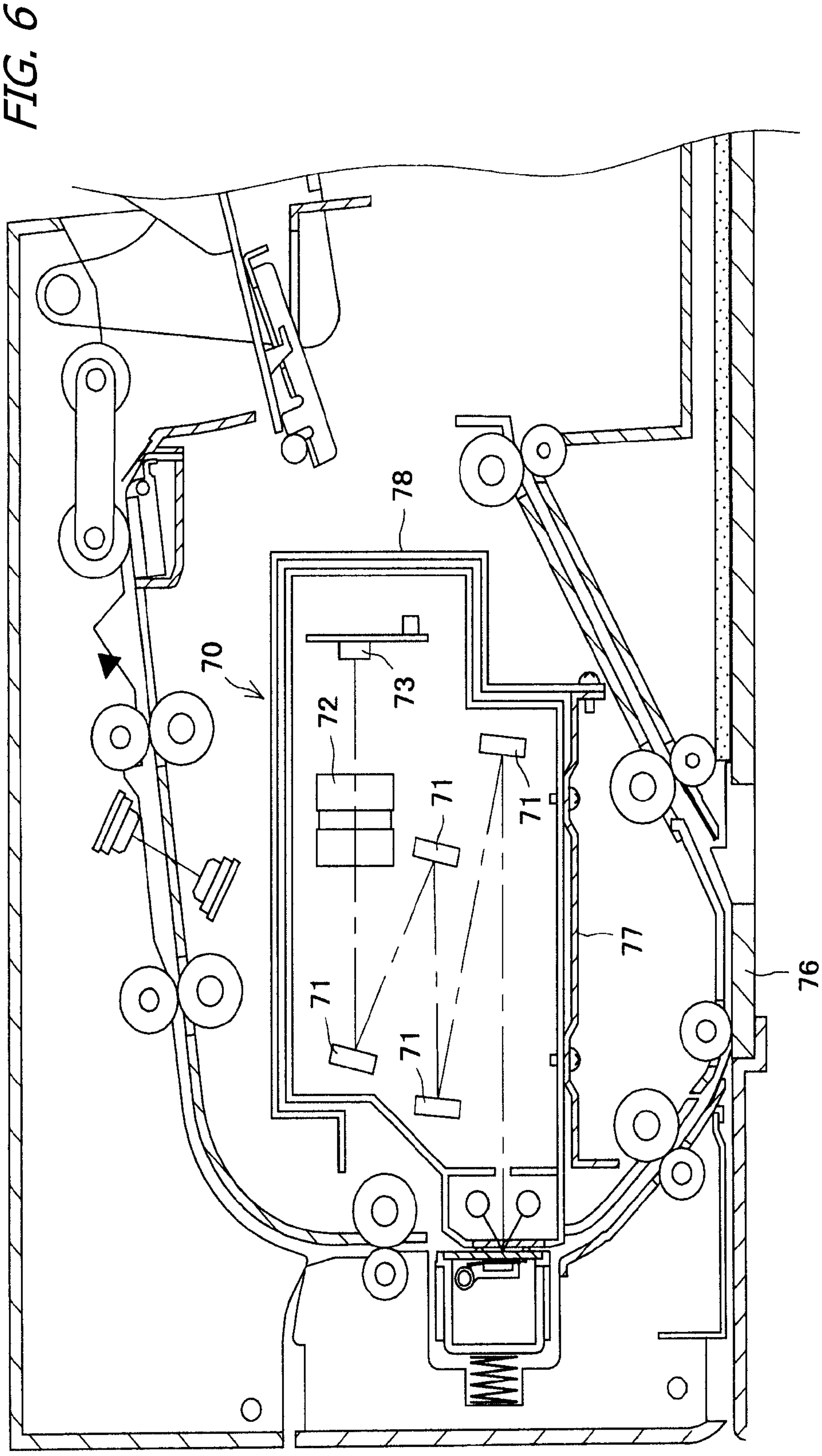
FIG. 6 is a sectional view of the essential portion of another embodiment of the present invention.

Note that a contact sensor unit 50 equipped with a contact sensor is adopted for the second image reading means, but as shown in FIG. 6, it is also acceptable to adopt a reduction-optics sensor unit 70 equipped with a plurality of mirrors 71 and a lens 72, and photoelectrical conversion means 73, such as a CCD.

Also, a second reading means 50 equipped with a contact sensor is disposed in the conveyance path P2 downstream of the platen 33, but as shown in FIG. 6, it is also acceptable to dispose a second reading means 70 upstream of a platen 76 to read originals at a first image reading means 75 of the bottom unit. In that case, the stay member 77 is mounted to the hinge device (not shown), and the holder member 78 is integrally fastened to the stay member 77 by screws or the like. Also, a side plate of the apparatus (not shown) is mounted to the stay member 77 and holder member 78. More specifically, the stay member 77 and holder member 78 are fastened to a hinge device that is substantially integrated.

Also, a second image reading means 70 is mounted to the stay member 77, the holder member 78 and apparatus side plate. Note that in the embodiment shown in FIG. 6, the second image reading means (an reduction-optics sensor unit) 70 is configured to be slidably removed from the front side of the apparatus. When second image reading means (the reduction-optics sensor unit) 70 are slid to the front of the apparatus, the stay member 77 and holder member 78 function to guide that the second reading means 70 to a predetermined position along a top surface of the stay member 77.

Thus as described above, the second image reading means 70 is substantially supported by the stay member, the sensor unit will not become mispositioned even if the apparatus frame becomes distorted from repeated opening and closing of the upper unit over the bottom unit, and it is possible to attain accurate and stable image readings.

What is claimed is:

1. An image reading apparatus for scanning documents conveyed by a document feeder, comprising:

an image-reading-apparatus main unit provided with a platen for the scanning of documents, and with a scanning means for scanning one side of a document on the platen;

a document feeder provided with a sheet supply tray for carrying documents, a sheet discharge tray for storing documents, a conveyance path leading from the sheet supply tray to the sheet discharge tray via the platen, and a scanning unit for scanning the other side of a document; and a hinge device open/closably connecting the document feeder to the image-reading-apparatus main unit; wherein said document feeder is furnished with a pair of side-plate frames disposed opposing each other, a stay member connecting said pair of side-plate frames, and said scanning unit is mounted on said stay member and at the same time said stay member is directly fixed, and thereby unitarily connected, to said hinge device by a fixing member.

2. The image reading apparatus according to claim 1, wherein said stay member is composed as a holder enclosing at least three sides of said scanning unit.

3. The image reading apparatus according to claim 1, wherein said scanning unit is detach/reattachable by sliding apparatus-frontward along said stay member.

4. The image reading apparatus according to claim 3, wherein:

said stay member is composed as a holder enclosing at least three sides of said scanning unit; and recesses are formed in each of opposing sides of said holder, and said scanning unit is provided with projections for engaging with the holder recessed portions in order to slide said document feeder, with said scanning unit sliding along the holder recessed portions.

5. The image reading apparatus according to claim 1, wherein a portion of said stay member is formed as a document conveyance guide for guiding documents into said conveyance path and to a document-scanning position in said scanning unit.

6. The image reading apparatus according to claim 1, wherein said scanning unit is configured to be detach/reattached by sliding apparatus-frontward, and at least a portion of said stay member has a guide surface for guiding, into a predetermined installation position, said scanning unit in being slid.

7. The image reading apparatus according to claim 1, wherein said hinge device has a first mounting member mounted on said image-reading-apparatus main unit, and a second mounting member mounted on said document feeder and connected to said first mounting member so as to allow said document feeder to open off of and close onto said image-reading-apparatus main unit.

8. The image reading apparatus according to claim 7, wherein said stay member along one end is directly fixed to said second mounting member by said fixing member of said hinge device, unitarily connecting said stay member and said hinge device.

* * * * *